United States Patent
Hunt (10) Patent No.: US 10,168,599 B2
(45) Date of Patent: Jan. 1, 2019

(54) SYSTEM AND METHOD FOR TIME REVERSAL SITUATIONAL AWARENESS

(71) Applicant: The Boeing Company, Chicago, IL (US)

(72) Inventor: Jeffrey H. Hunt, Thousand Oaks, CA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 15/006,244

(22) Filed: Jan. 26, 2016

(65) Prior Publication Data
US 2017/0212407 A1 Jul. 27, 2017

(51) Int. Cl.
*G02F 1/35* (2006.01)
*G01S 7/481* (2006.01)

(52) U.S. Cl.
CPC ............ *G02F 1/353* (2013.01); *G01S 7/4816* (2013.01); *G02F 1/3501* (2013.01); *G02F 1/3534* (2013.01); *G02F 2001/3503* (2013.01)

(58) Field of Classification Search
CPC .......... G02F 1/35; G02F 1/3501; G02F 1/353; G02F 1/3534; G02F 2001/3503
See application file for complete search history.

(56) References Cited

U.S. PATENT DOCUMENTS

| | | | | |
|---|---|---|---|---|
| 4,529,273 A | * | 7/1985 | Cronin-Golomb | ... G02F 1/3538 359/300 |
| 4,739,496 A | | 4/1988 | Marom et al. | |
| 4,897,562 A | * | 1/1990 | Krasinski | ................ H04J 14/02 359/328 |
| 5,093,834 A | | 3/1992 | Morris | |
| 5,150,170 A | | 9/1992 | Morris | |
| 5,596,667 A | * | 1/1997 | Watanabe | ............. G02F 1/3538 372/21 |
| 5,694,239 A | * | 12/1997 | Shigematsu | .......... G02F 1/3538 359/326 |
| 5,771,117 A | * | 6/1998 | Harris | ..................... G02F 1/353 359/326 |
| 5,798,853 A | * | 8/1998 | Watanabe | ............. G02F 1/3538 359/300 |
| 6,522,818 B1 | * | 2/2003 | Aso | ........................ G02B 6/278 359/341.1 |

(Continued)

OTHER PUBLICATIONS

Pepper, David M., Applications of Optical Phase Conjugation, Scientific American, Jan. 1986, pp. 74-83.

*Primary Examiner* — Daniel Petkovsek
(74) *Attorney, Agent, or Firm* — Toler Law Group, P.C.

(57) ABSTRACT

A system and method are disclosed for providing time reversal situational awareness. An input filter receives an input signal at a first frequency and a pump signal at a second frequency and blocks signals at a third predetermined frequency. A non-linear medium performs a second order operation or a third order operation on the filtered input signal and the filtered pump signal to produce an output signal at the third frequency, the third frequency lower than the first frequency and the second frequency. An output filter is coupled to receive the output signal from the non-linear medium and blocks signals at the first frequency and at the second frequency such that a filtered output signal is generated that is a phase conjugate signal which provides time reversal situational awareness.

20 Claims, 6 Drawing Sheets

(56) References Cited

U.S. PATENT DOCUMENTS

| | | | |
|---|---|---|---|
| 7,453,626 B2* | 11/2008 | Lett | G02F 1/3536 |
| | | | 359/326 |
| 7,764,423 B2* | 7/2010 | McKinstrie | G02F 1/3536 |
| | | | 359/326 |
| 8,330,642 B2* | 12/2012 | Jin | G01S 13/9035 |
| | | | 342/159 |
| 9,625,320 B2* | 4/2017 | Chitgarha | G01J 3/45 |
| 2005/0213194 A1* | 9/2005 | Kim | G02F 1/3534 |
| | | | 359/328 |
| 2006/0092500 A1* | 5/2006 | Melloni | G02F 1/3534 |
| | | | 359/330 |

* cited by examiner

SYSTEM AND METHOD FOR TIME REVERSAL SITUATIONAL AWARENESS

FIELD

This disclosure relates generally to a system and method for time reversal situational awareness.

BACKGROUND

Situational awareness is commonly defined as the perception of environmental elements with respect to time or space, the comprehension of their meaning, and the projection of their status after some variable has changed, such as time, or some other variable, such as a predetermined event. Situational awareness is understanding of the environment critical to decision-makers in areas involving complex and dynamic tasks (e.g., aviation, air traffic control, ship navigation, power plant operations, military command and control, and emergency services) to more ordinary but still complex tasks (e.g., automobile operation). Situational awareness is improved based on the use of sensors to obtain status information about the particular environmental elements. However, even with a full set of sensors monitoring the environmental elements of interest, there may be points in time when events relating to such environmental elements have occurred that were missed. It would thus be desirable to have a way to reconstruct in either physical or informational space, situations that no longer exist to identify events not captured by the set of sensors.

Accordingly, there is a need for a system and method for time reversal situational awareness that is performed independently from acquired sensor data.

SUMMARY

In a first aspect, a system for providing time reversal situational awareness based on a received input signal at a first predetermined frequency includes an input filter, a non-linear medium, and an output filter. The input filter receives the input signal and a pump signal at a second predetermined frequency. The input filter is configured to block signals at a third predetermined frequency. The non-linear medium is coupled to an output of the input filter for receiving the filtered input signal and the filtered pump signal. The non-linear medium is configured to perform a second order operation or a third order operation on the filtered input signal and the filtered pump signal to produce an output signal at the third predetermined frequency. The third predetermined frequency is lower than the first predetermined frequency and the second predetermined frequency. The output filter is coupled to receive the output signal from the non-linear medium. The output filter is configured to block signals at the first predetermined frequency and at the second predetermined frequency such that a filtered output signal is generated that is a phase conjugate signal which provides time reversal situational awareness.

In a second aspect, a method for providing time reversal situational awareness includes three steps. First, an input signal at a first predetermined frequency and a pump signal at a second predetermined frequency are filtered to block signals at a third predetermined frequency. Second, a second order operation or a third order operation is performed on the filtered input signal and the filtered pump signal to produce an output signal at the third predetermined frequency. Third, the output signal from the non-linear medium is filtered to block signals at the first predetermined frequency and at the second predetermined frequency such that a filtered output signal is generated that is a phase conjugate signal which provides time reversal situational awareness.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure.

It is well known that certain types of nonlinear optical processes involve the generation of a conjugate wave. The most common is the so-called phase conjugation process. In this four-wave mixing process, laser signals interact in such a way as to generate a signal whose propagation is the algebraic conjugate of the input. In a mathematical concept, a wave of $\exp(k \cdot x + i\omega t)$ becomes $\exp(k \cdot x - i\omega t)$. As such, the wave appears to "run backwards" although the signal is not really going backwards in time. Instead, the wave is returning to a prior condition. However, this is not only the case for straight phase conjugation. A phase conjugate signal (i.e., a signal where the term "$+i\omega t$" is changed to "$-i\omega t$") occurs any time that a nonlinear optical process involves the creation of a wave that has a lower frequency that the input wave. For example, in stimulated Brillouin scattering, the lower frequency output signal travels with a $k \cdot x - i\omega t$ propagation, even though the $\omega$ will have shifted in value from the original.

Applying this to an imaging situation, if a coherent signal (e.g., an input signal generated as a result of active illumination) is received and put through a conjugating process, the output signal will include the $-i\omega t$ term and thus seem to move backwards in time. In other words, the output signal will show the state of the image before the input signal was actually received. This results from the physical response to a nonlinear medium to reverse the propagation of the signals, leading to knowledge of the system before the coherent images were received. In order to create a light beam with the time-reversed propagation, it is important to generate a beam that is shifted to a lower frequency, via a nonlinear optical process. These non-linear optical processes fall broadly into two categories, second order and third order processes.

Figure 1:
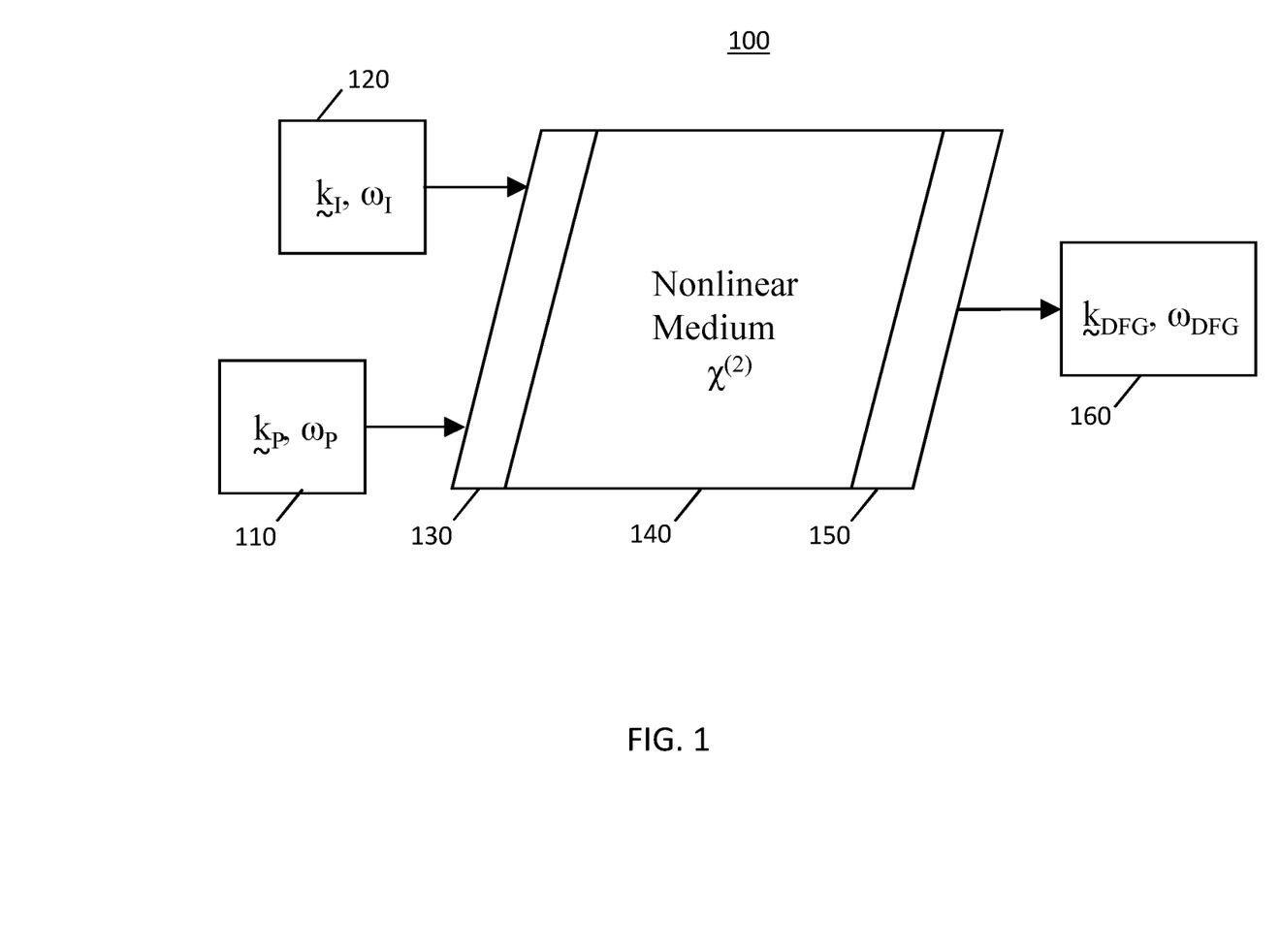
FIG. 1 is a block diagram of a system for providing a time-reversal situational awareness output signal in accordance with a first embodiment.

In a first version of a second order case shown in FIG. 1, a system 100 for applying difference frequency generation (DFG) is shown which includes a common input filter for both input sources. Difference frequency generation (DFG) is a second order operation. An image at a frequency $\omega_I$ 120 is a first input (i.e., an input signal) and a pump laser frequency $\omega_P$ 110 is a second input (i.e., a pump signal). The two inputs 110, 120 are first applied to an input optical filter 130 and then the filtered versions are applied to a non-linear medium $\chi^{(2)}$ 140, and then to an output filter 150. Examples of a non-linear medium that could be used for non-linear medium $\chi^{(2)}$ 140 include (but are not limited to): Potassium Titanyl Phosphate (KTP), Potassium DiHydrogen Phosphate (KDP), Potassium Titanyl Arsenate (KTA), Lithium Triborate (LBO), Beta Barium Borate (BBO), and Lithium Niobate (LiNbO3). By performing DFG with a pump laser frequency $\omega_P$, a mixing signal $\omega_{DFG}$ 160 is produced, where $\omega_{DFG}=\omega_P-\omega_I$. Given that these conditions are satisfied, a signal $k_{DFG}$ is then a conjugate signal.

The input optical filter 130 blocks any stray light at the frequency $\omega_{DFG}$, the output optical filter 150 transmits light at frequency $\omega_{DFG}$, while blocking light at the frequencies $\omega_I$ and $\omega_P$. This ensures that the output signal $\omega_{DFG}$ 160 results only from the nonlinear interaction of the nonlinear medium $\chi^{(2)}$ 140. Since the propagation function is a conjugate to the signal, allowing the signal to propagate will thus recreate $\omega_I$ at any earlier point in time, with only a frequency shift.

Figure 2:
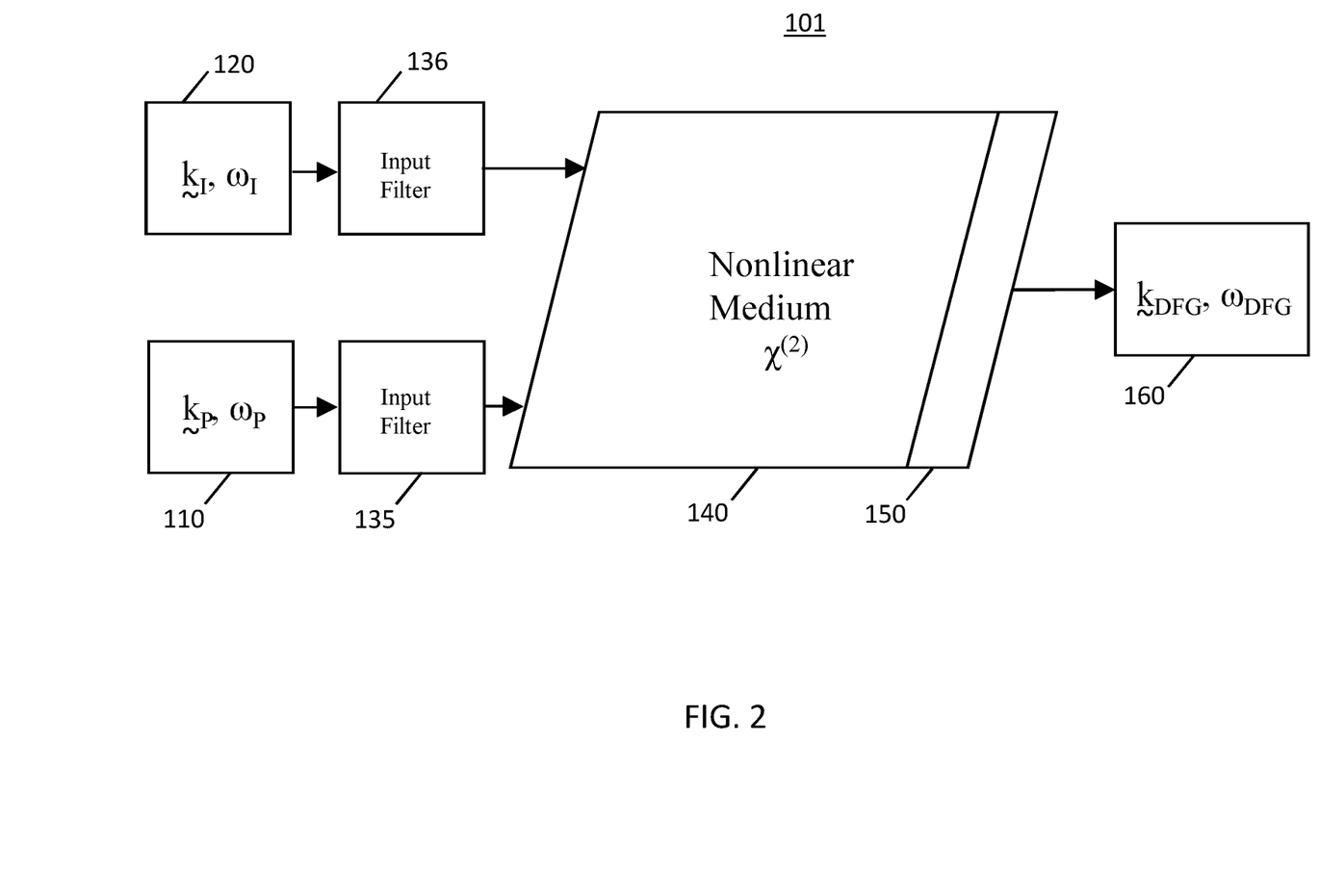
FIG. 2 is a block diagram of a system for providing a time-reversal situational awareness output signal in accordance with a second embodiment.

In a second version of a second order case shown in FIG. 2, a system 101 for applying difference frequency generation (DFG) is shown which includes separate input filters for each input source. An image at a frequency $\omega_I$ 120 is a first input and a pump laser frequency $\omega_P$ 110 is a second input. The two inputs 110, 120 are each applied to a respective separate input optical filter 135, 136 and then the filtered versions are applied to a non-linear medium $\chi^{(2)}$ 140, and then to an output filter 150. By performing DFG with a pump laser frequency $\omega_P$, a mixing signal $\omega_{DFG}$ 160 is produced, where $\omega_{DFG}=\omega_P-\omega_I$. Given that these conditions are satisfied, a signal $k_{DFG}$ is then a conjugate signal.

In the FIG. 2 embodiment, each input optical filter 135, 136 blocks any stray light at the frequency $\omega_{DFG}$. In addition, input optical filter 135 also blocks light at the frequency $\omega_I$ while input optical filter 136 also blocks light at the frequency $\omega_P$. The output optical filter 150 transmits light at frequency $\omega_{DFG}$, while blocking light at the frequencies $\omega_I$ and $\omega_P$. This ensures that the output signal $\omega_{DFG}$ 160 results only from the nonlinear interaction of the nonlinear medium $\chi^{(2)}$ 140. Since the propagation function is a conjugate to the signal, allowing the signal to propagate will thus recreate $\omega_I$ at any earlier point in time, with only a frequency shift.

Figure 3:
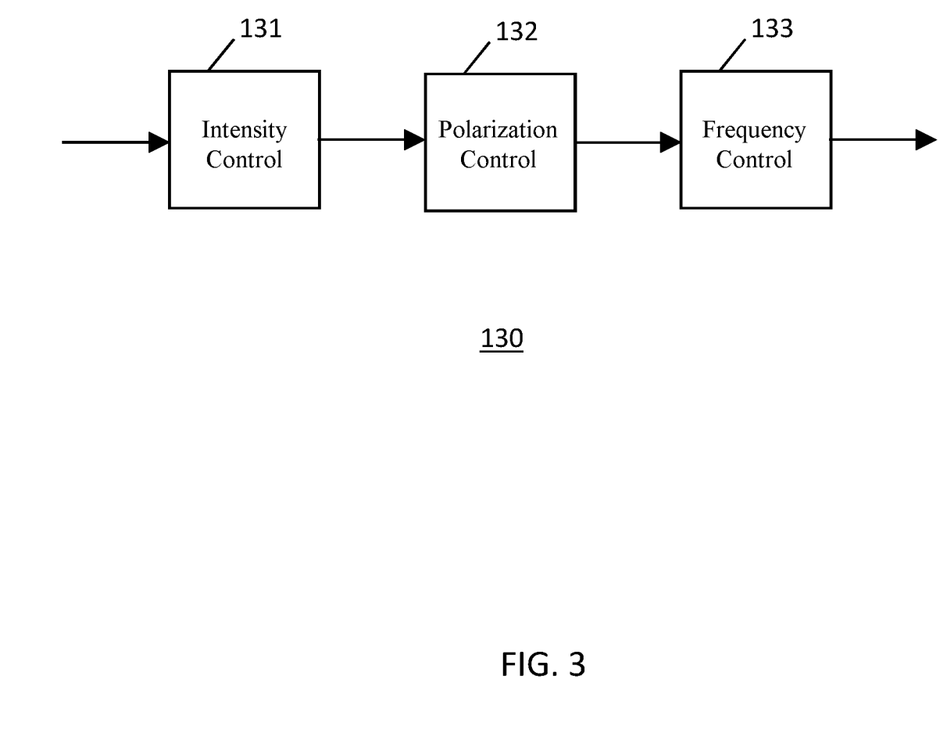
FIG. 3 is a block diagram of an input filter for use in the system for providing a time-reversal situational awareness output signal of the present disclosure.

Referring now to FIG. 3, input optical filter 130 includes an intensity control element 131, a polarization control element 132 and a frequency control element 133. The frequency control element 133 must be the final element in input filter 130, although the order of intensity control element 131 and polarization control element 132 may be reversed. Intensity control element 131 is a lens or lens combination designed to control the diameter of the light beam that propagates through the nonlinear material 140 in FIG. 1. Polarization control element 132 is a combination of polarizer and waveplate used to control the polarization of the light beam that propagates through the nonlinear material 140 in FIG. 1. Frequency control element 133 is an optical filter designed to transmit light at frequencies $\omega_I$ and $\omega_P$, while not transmitting any light at frequency $\omega_{DFG}$. Input optical filters 135, 136 of FIG. 2 include the same elements of an intensity control element, a polarization control element and a frequency control element, with the only difference being that the respective frequency control element in input optical filters 135, 136 is configured to only pass light at the frequency of light of the associated input source (i.e., $\omega_I$ or $\omega_P$) and to block light at the frequency of light of the other input source (i.e., $\omega_P$ or $\omega_I$).

Figure 4:
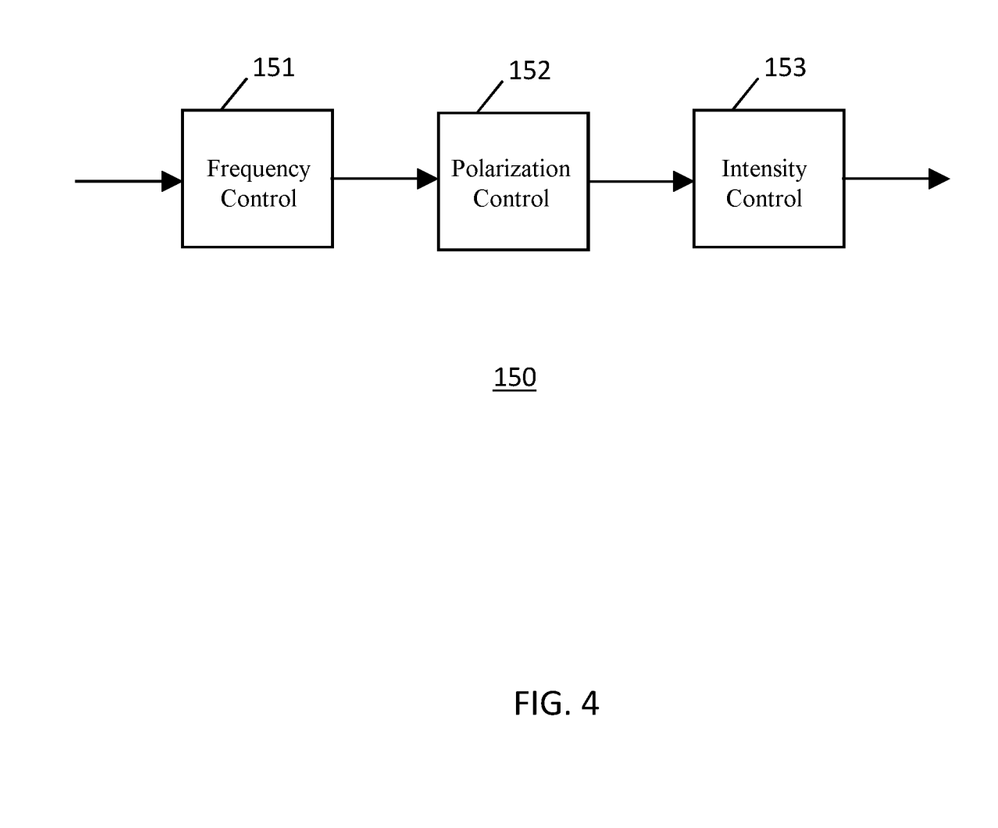
FIG. 4 is a block diagram of an input filter for use in the system for providing a time-reversal situational awareness output signal of the present disclosure.

Referring now to FIG. 4, the output optical filter 150 includes a frequency control element 151, a polarization control element 152 and an intensity control element 153. The frequency control element 151 is an optical filter designed to block light at frequencies $\omega_I$ and $\omega_P$, while transmitting light at frequency $\omega_{DFG}$. The frequency control element 151 is the first element in output optical filter 150, while the order of polarization control element 152 and intensity control element 153 may be reversed. Polarization control element 152 is a combination of polarizer and waveplate used to control the polarization of the light beam that exits output optical filter 150. Intensity control element 153 is a lens or lens combination designed to control the diameter of the light beam that exits output optical filter 150.

Figure 5:
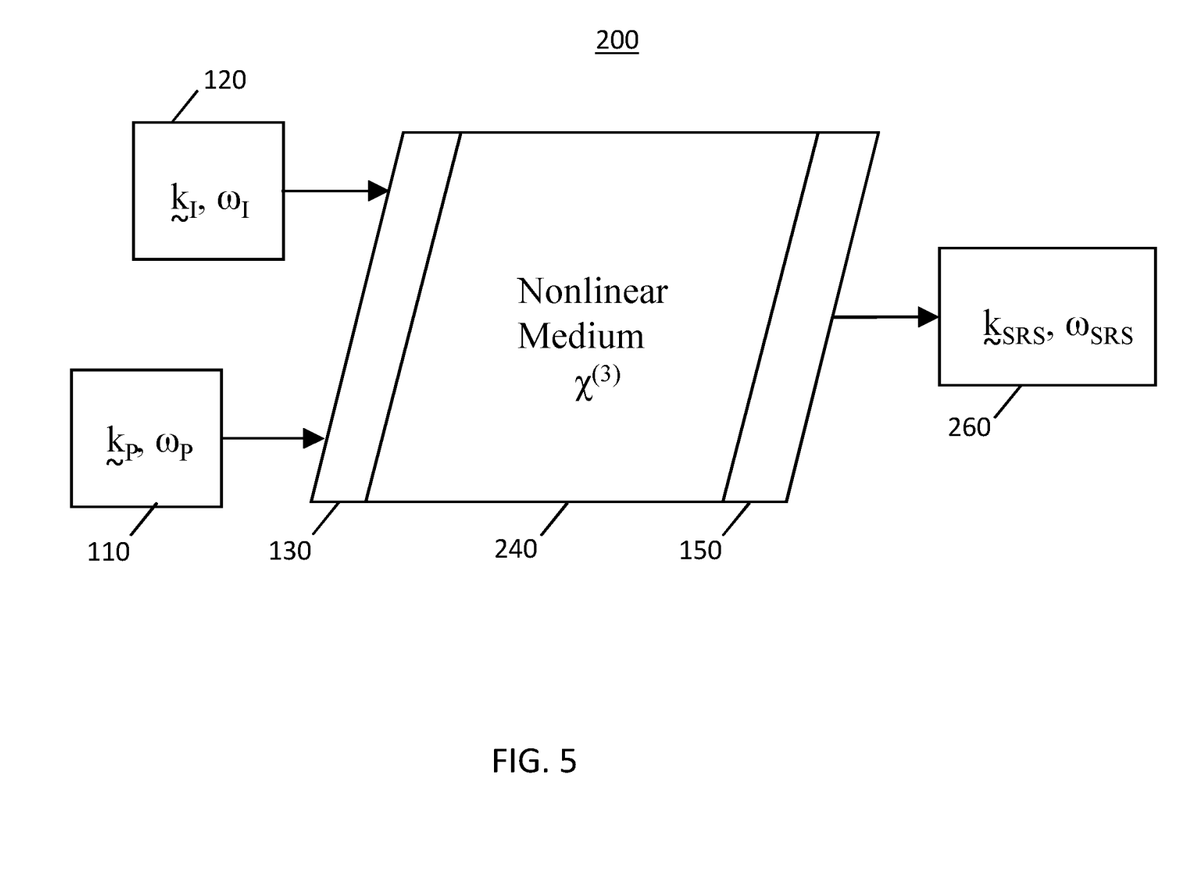
FIG. 5 is a block diagram of a system for providing a time-reversal situational awareness output signal in accordance with a third embodiment.
Figure 6:
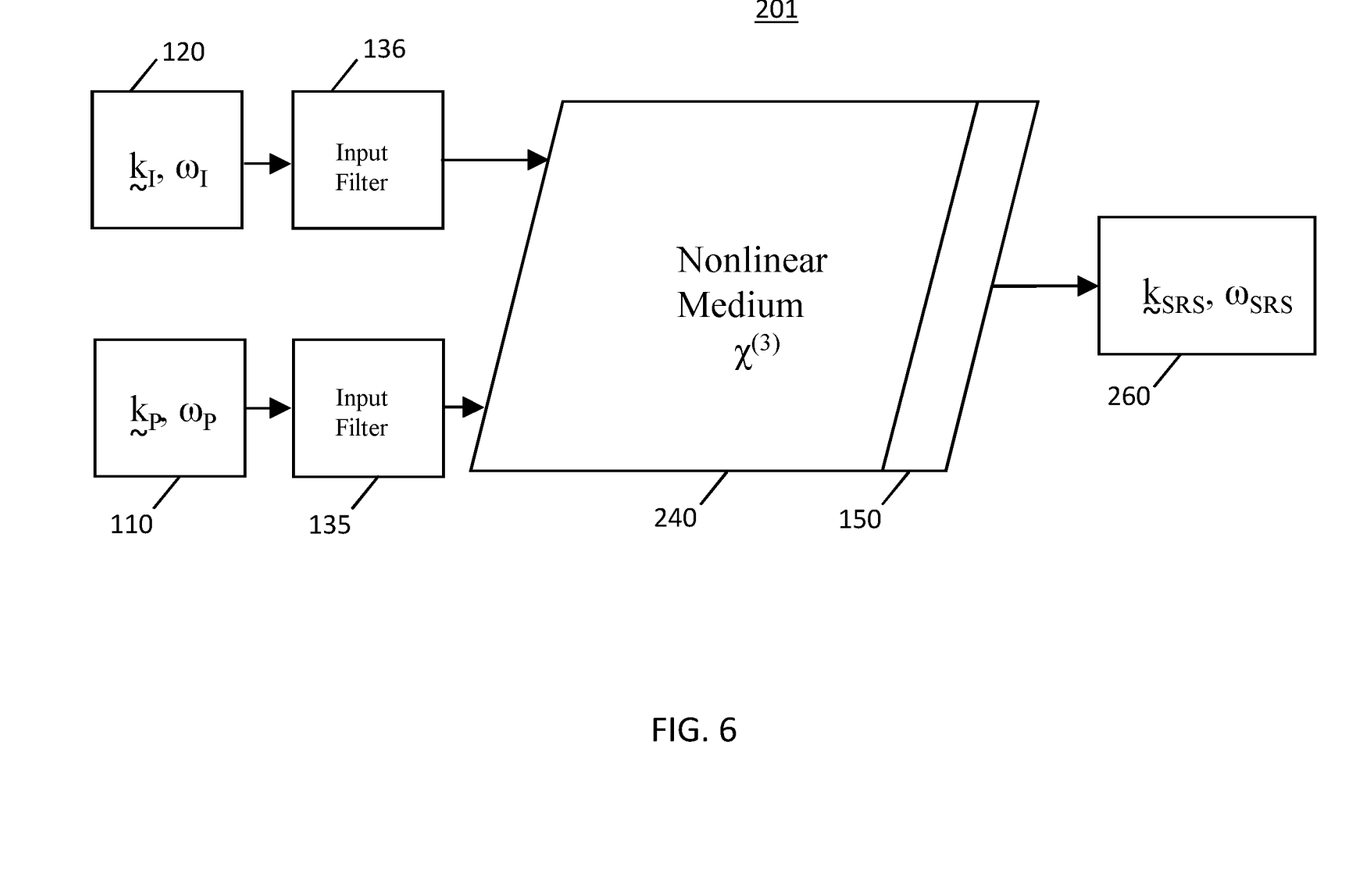
FIG. 6 is a block diagram of a system for providing a time-reversal situational awareness output signal in accordance with a fourth embodiment.

A first version of a third order case is shown in FIG. 5 which is analogous to the second order case of FIG. 1, substituting a third-order nonlinear medium $\chi^{(3)}$ 240 for the second-order nonlinear medium $\chi^{(2)}$ 140 of FIG. 1 to produce an output signal $\omega_{SRS}$ 260. Examples of a non-linear medium that could be used for non-linear medium $\chi^{(3)}$ 240 include (but are not limited to): Potassium Titanyl Phosphate (KTP), Potassium DiHydrogen Phosphate (KDP), Potassium Titanyl Arsenate (KTA), Lithium Triborate (LBO), Beta Barium Borate (BBO), and Lithium Niobate (LiNbO3). The third-order nonlinear medium $\chi^{(3)}$ 240 may involve stimulated Raman scattering, stimulated Brillouin scattering, or phase conjugation (all third order operations), with the constraint that the output signal must be at a lower frequency than the input signal. In particular, for stimulated Raman scattering (SRS), the output signal $\omega_{SRS}$ 260 equals $2*(\omega_I-\omega_P)$, subject to the condition that $\omega_P>\omega_I$. As with the FIG. 1 embodiment, the input filter 130 passes $\omega_I$ and $\omega_P$ but blocks any spurious signal at the frequency of the output signal $\omega_{SRS}$. The output filter 150 only passes signals at $\omega_{SRS}$, blocking light at the frequencies $\omega_I$ and $\omega_P$. Given that these conditions are satisfied, a signal $k_{SRS}$ is then a conjugate signal.

A second version of a third order case shown in FIG. 5 which is analogous to the second order case of FIG. 2, substituting a third-order nonlinear medium $\chi^{(3)}$ 240 for the second-order nonlinear medium $\chi^{(2)}$ 140 of FIG. 2 to produce an output signal $\omega_{SRS}$ 260. The third-order nonlinear medium $\chi^{(3)}$ 240 may involve stimulated Raman scattering, stimulated Brillouin scattering, or phase conjugation, with the constraint that the output signal must be at a lower frequency than the input signal. In particular, for stimulated Raman scattering (SRS), the output signal $\omega_{SRS}$ 260 equals $2*(\omega_I-\omega_P)$, subject to the condition that $\omega_P>\omega_I$. As with the FIG. 1 embodiment, the input filter 130 passes $\omega_I$ and $\omega_P$ but blocks any spurious signal at the frequency of the output signal $\omega_{SRS}$. The output filter 150 only passes signals at $\omega_{SRS}$, blocking light at the frequencies $\omega_I$ and $\omega_P$. Given that these conditions are satisfied, a signal $k_{SRS}$ is then a conjugate signal.

The effective nonlinear polarization can be written as:

$$\vec{P}_S^{(3)}(\vec{k}_s=-\vec{k}_i,\omega)=\chi^{(3)}(\omega):E_1(k_1)E'_1(-k_1)E_i^*(k_i) \quad (1)$$

where $E_1$, $E'_1$ and $E_i^*$ are incident waves. (The subscript "s" on the output polarization represents the output wave.) It should be noted that each incident waves has an independent K value. It should also be noted that the K vector for the third order polarization is equal to the negative incident, $-k_i$. From symmetry considerations the third order polarization can then be expressed as:

$$=A(E_1 \cdot E_i^*)E_1'+B(E_1' \cdot E_i^*)E_1+C(E_1 \cdot E_1')E_i^* \quad (2)$$

where A, B and C are coefficients that all depend on an angle $\theta$ between the $E_1$ and $E_i$, and $B(\theta)=A(\pi-\theta)$. Since these are all vector quantities, by properly arranging the polarizations of the three incoming waves, it is possible to have only one term nonzero. If this nonzero term is the third term, then the amplitude is $E_1^*$, the phase conjugate of one of the inputs. This signal, derived from the third order polarization, is the one that is used to reconstruct the original configurations since the conjugate wave will have a propagation term that is effectively running in reverse from the input signal (as discussed above).

There are a number of different applications for the system and method for time reversal situational awareness disclosed herein. In imaging, for example, if a signal is being monitored that provides an image of an object, that signal provides a time dependent representation of what the object is doing from the point at which data is being collected. However, no information is available relative to what the object was doing before the data collection began. The phase conjugate signal discussed above provides the ability to back calculate what the object was doing for a period of time before the data collection began. This can be useful for inspection purposes, etc. Note that the behavior that can be identified depends on the collected signal and whether there may have been a major "state" change in the object (e.g., movement of the object into the path of the imaging device). But for some span of time (e.g., back to the time in which the object was placed into the path of the imaging device), information about the behavior of the object may be obtained.

The phase conjugate signal is also useful for image reconstruction. As light travels through a dispersive medium such as air in the atmosphere, the propagation of the light can be disrupted. By obtaining the phase conjugate signal for the received light signal, information can be obtained about what the image looked like as the light signal left the object prior to the dispersal of that light signal in the air (i.e., the image will not include noise effects caused by the dispersive medium). Similarly, the phase conjugate signal is useful for ranging reconstruction. The same notion applies to a LIDAR signal (a remote sensing technology that measures distance by illuminating a target with a laser and analyzing the reflected light), an optical ranging signal can be reconstructed to identify the distortions caused by the air in the atmosphere. Finally, the phase conjugate signal can be used for communications signal reconstruction. Any communications signal is subject to "breakup" when traveling through a medium such as the air or a fiber optic pathway. The phase conjugate signal can provide information about the signal source (e.g., physical position, etc.) prior to the initiation of data collection.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A system for providing time reversal situational awareness, the system comprising:
    an input filter for receiving an input signal at a first frequency and a pump signal at a second frequency, the input filter configured to block signals at a third frequency, wherein the input signal comprises an image of an object;
    a single non-linear medium directly coupled to an output of the input filter, the single non-linear medium configured to receive the input signal and the pump signal from the input filter, the single non-linear medium further configured to perform a second order operation or a third order operation on the input signal and the pump signal to generate an output signal at the third frequency, the third frequency lower than the first frequency and the second frequency, wherein the output signal includes a phase conjugate signal;
    an output filter coupled to receive the output signal directly from the single non-linear medium, the output filter configured to block signals at the first frequency and at the second frequency and to generate a filtered output signal that includes only the phase conjugate signal; and
    calculation circuitry configured to determine, based on the phase conjugate signal, behavior of the object prior to receipt of the input signal.

2. The system of claim 1, wherein the single non-linear medium is configured to perform a second order operation.

3. The system of claim 2, where the second order operation is a difference frequency generation operation.

4. The system of claim 1, wherein the single non-linear medium is configured to perform a third order operation.

5. The system of claim 4, wherein the third order operation is a stimulated Raman scattering operation.

6. The system of claim 4, wherein the third order operation is a stimulated Brillouin scattering operation.

7. The system of claim 4, wherein the third order operation is a phase conjugation operation.

8. The system of claim 1, wherein the filtered output signal is used to identify information about the object prior to receipt of the input signal.

9. The system of claim 1, wherein the behavior of the object corresponds to movement of the object prior to receipt of the input signal.

10. The system of claim 1, wherein the input filter comprises:
    an intensity control element;
    a polarization control element coupled to the intensity control element; and
    a frequency control element coupled to the polarization control element.

11. The system of claim 10, wherein the intensity control element comprises one or more lenses, wherein the polarization control element comprises a polarizer and a waveplate, and wherein the frequency control element comprises an optical filter.

12. The system of claim 1, wherein the single non-linear medium comprises Potassium Titanyl Phosphate, Potassium DiHydrogen Phosphate, or Potassium Titanyl Arsenate.

13. The system of claim 1, wherein the single non-linear medium comprises Lithium Triborate or Beta Barium Borate.

14. A method for providing time reversal situational awareness, the method comprising:
- filtering an input signal at a first frequency and a pump signal at a second frequency to block signals at a third frequency, wherein the input signal comprises an image of an object;
- performing, at a single non-linear medium, a second order operation or a third order operation directly on the input signal and the pump signal to generate an output signal at the third frequency, the third frequency lower than the first frequency and the second frequency, wherein the output signal includes a phase conjugate signal;
- filtering the output signal received directly from the single non-linear medium to block signals at the first frequency and at the second frequency and to generate a filtered output signal that includes only the phase conjugate signal; and
- determining, based on the phase conjugate signal, behavior of the object prior to receipt of the input signal.

15. The method of claim 14, wherein the single non-linear medium performs a second order operation.

16. The method of claim 15, where the second order operation is a difference frequency generation operation.

17. The method of claim 14, wherein the single non-linear medium performs a third order operation.

18. The method of claim 17, wherein the third order operation is a stimulated Raman scattering operation or a stimulated Brillouin scattering operation.

19. The method of claim 17, wherein the third order operation is a phase conjugation operation.

20. The method of claim 14, further comprising identifying information about the object prior to receipt of the input signal based on the filtered output signal.

* * * * *